United States Patent
Uchida

(10) Patent No.: US 6,424,434 B1
(45) Date of Patent: Jul. 23, 2002

(54) IMAGE SCANNING UNIT

(75) Inventor: Toru Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/232,812

(22) Filed: Jan. 19, 1999

(30) Foreign Application Priority Data

Jan. 16, 1998 (JP) ............................................. 10-020405

(51) Int. Cl.7 ................................................. H04N 1/04
(52) U.S. Cl. ....................................... 358/474; 358/1.5
(58) Field of Search ................................. 358/474, 315, 358/255, 1.5, 432, 433

(56) References Cited

U.S. PATENT DOCUMENTS 4,555,169 A  *  11/1985  Suda ........................... 354/407

FOREIGN PATENT DOCUMENTS

| JP | 62-112248 | 7/1987 |
| JP | 63-183748 | 11/1988 |
| JP | 3-3561 | 1/1991 |
| JP | 6-167644 | 6/1994 |
| JP | 6-311310 | 11/1994 |
| JP | 7-7604 | 1/1995 |
| JP | 8-97967 | 4/1996 |
| JP | 40042096 A | * 2/1998 ......... H04N/1/0028 |

* cited by examiner

Primary Examiner—Jerome Grant, II
Assistant Examiner—Negussie Worku
(74) Attorney, Agent, or Firm—Young & Thompson

(57) ABSTRACT

Disclosed is an image scanning unit which has: a CCD substrate which is mounted on a block; three groups of adjustment fastening members to position the CCD substrate in three dimensional directions orthogonal to one another; and a springy member to press each of the adjustment fastening members against receiving part of each of the adjustment fastening members; wherein the three groups of adjustment fastening members are of a first group of fastening members to conduct the focus adjustment by independently positioning the CCD substrate in a direction perpendicular to the plane of the CCD substrate at both ends of CCD in the longitudinal direction, a second group of fastening members to conduct the sub-scanning adjustment by independently positioning the CCD substrate in a direction orthogonal to the longitudinal direction of the CCD substrate within the plane of the CCD substrate at both ends of CCD in the longitudinal direction, and a third group of fastening member tot conduct the main-scanning adjustment by independently positioning the CCD substrate in a direction along the longitudinal direction of the CCD substrate within the plane of the CCD substrate.

6 Claims, 5 Drawing Sheets

IMAGE SCANNING UNIT

FIELD OF THE INVENTION

This invention relates to an image scanning unit, and more particularly to, a mechanism for positioning a CCD substrate in image scanning unit of a facsimile machine, a digital copying machine etc.

BACKGROUND OF THE INVENTION

In such an image scanning unit using one-dimensional CCD, fine positioning of CCD will be necessary as high-resolution and color machines become widely used in future years.

Japanese patent application laid-open No. 60-115904 (1985) discloses a positioning and adjusting mechanism for image sensor which, to solve the problem that fine positioning of image sensor to scanning line cannot be performed because of not having a mechanism to adjust it three-dimensionally and independently, is composed of: a first plate which is engaged to an optical frame to be disposed on the scanning line and is movable up and down to the frame; a second plate which is movable right and left and to the first plate while engaging to the first plate and is movable back and forth to the optical frame; and a third plate which holds an image sensor disposed on its plane facing the second plate and is movable in a fan-shaped range to the second plate, wherein these plates are moved to allow the image sensor to be positioned and adjusted three-dimensionally and independently to the scanning line.

However, the conventional positioning and adjusting mechanism needs to be improved since it is short of degree of freedom on adjustment and furthermore requires a lot of skill for its operation.

SUMMARY OF THE INVENTION

Accordingly, it is an object of the invention to provide an image scanning unit that brings facilitation in the positioning adjustment of CCD substrate, enhancing the precision of positioning adjustment and enhancing the efficiency of adjustment work.

According to the invention, an image scanning unit, comprises:

a CCD substrate which is mounted on a block;

three groups of adjustment fastening members to position the CCD substrate in three dimensional directions orthogonal to one another; and a springy member to press each of the adjustment fastening members against receiving part of each of the adjustment fastening members;

wherein the three groups of adjustment fastening members are composed of a first group of fastening members to conduct the focus adjustment by independently positioning the CCD substrate in a direction perpendicular to the plane of the CCD substrate at both ends of CCD in the longitudinal direction, a second group of fastening members to conduct the sub-scanning adjustment by independently positioning the CCD substrate in a direction orthogonal to the longitudinal direction of the CCD substrate within the plane of the CCD substrate at both ends of CCD in the longitudinal direction, and a third group of fastening member to conduct the main-scanning adjustment by independently positioning the CCD substrate in a direction along the longitudinal direction of the CCD substrate within the plane of the CCD substrate.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
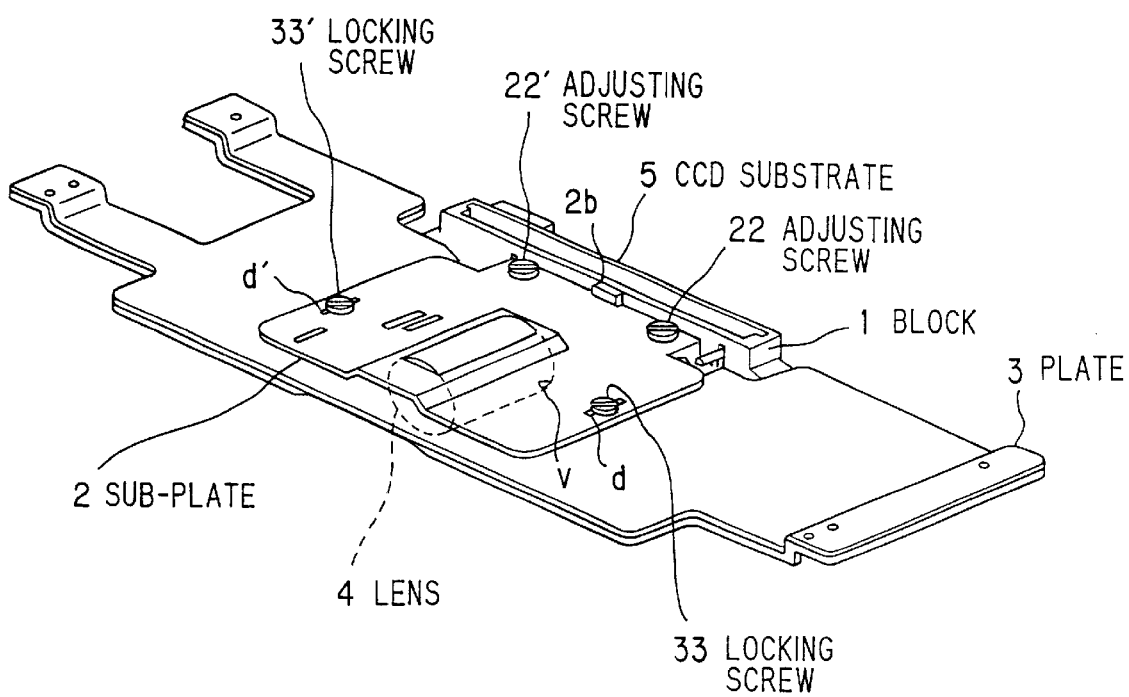
FIG. 1 is a perspective view showing the appearance of an image scanning unit in a preferred embodiment according to the invention.

The preferred embodiment of the invention is explained. An image scanning unit in the preferred embodiment of the invention comprises a CCD substrate (5 in FIG. 2) which is mounted on a block (1 in FIG. 2); three groups of adjustment fastening members ((21, 21'), (22,22') and 23 in FIG. 2) to position the CCD substrate in three dimensional directions orthogonal to one another; and springy members ((11, 11') and (12 and 12') in FIG. 2) to press each of the adjustment fastening members against receiving part of each of the adjustment fastening members;

wherein the three groups of adjustment fastening members are composed of a first group of fastening members (21, 21' in FIG. 2) to conduct the focus adjustment by independently positioning the CCD substrate in directions (X1, X1' in FIG. 5) perpendicular to the plane of the CCD substrate at both ends of CCD in the longitudinal direction, a second group of fastening members (22, 22' in FIG. 2) to conduct the sub-scanning adjustment by independently positioning the CCD substrate in directions (X2, X2'in FIG. 5) orthogonal to the longitudinal direction of the CCD substrate within the plane of the CCD substrate at both ends of CCD in the longitudinal direction, and a third group of fastening member (23 in FIG. 2) to conduct the main-scanning adjustment by independently positioning the CCD substrate in a direction (X3 in FIG. 5) along the longitudinal direction of the CCD substrate within the plane of the CCD substrate.

Figure 2:
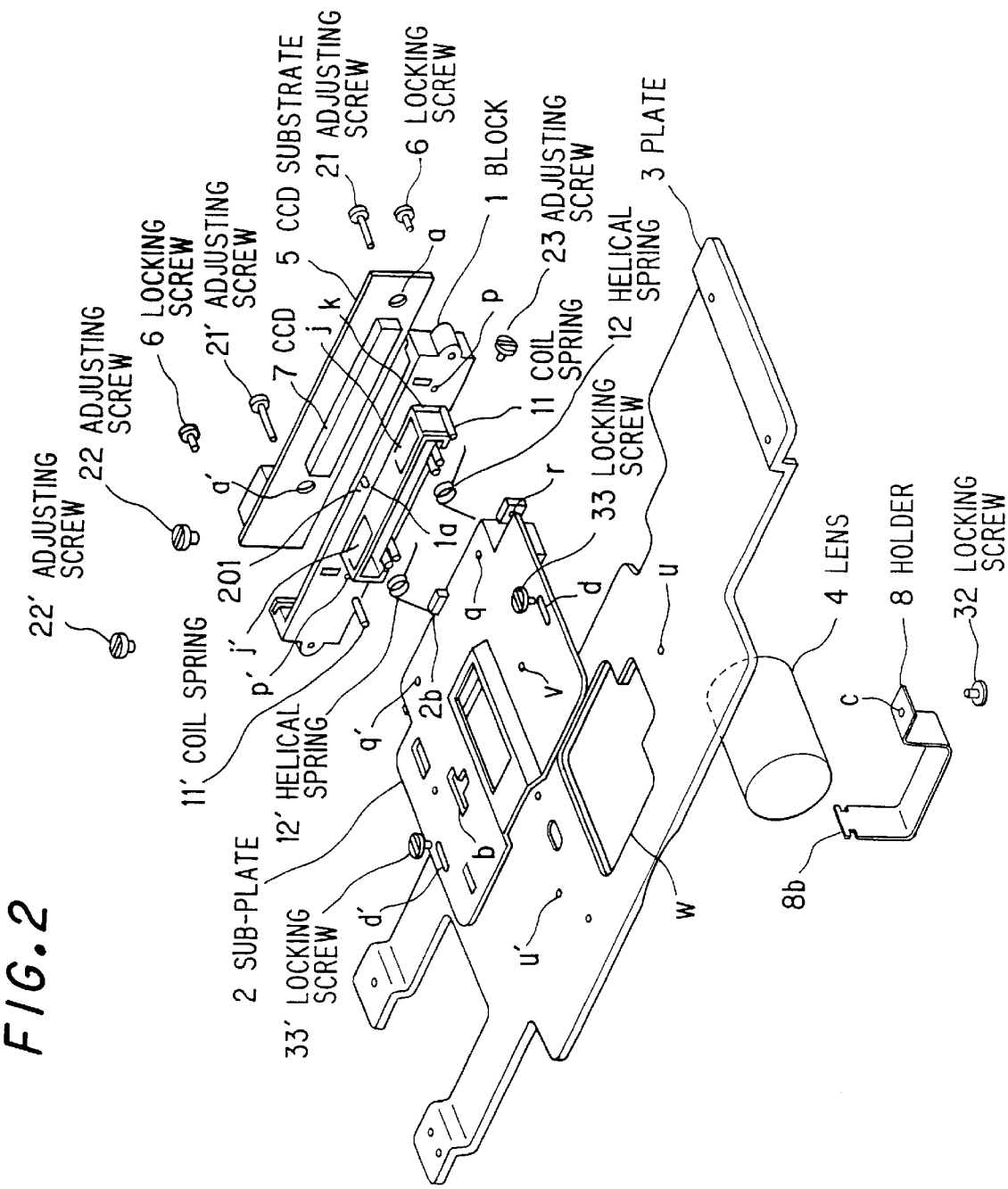
FIG. 2 is a broken perspective view showing the image scanning unit in FIG.1.

The block (1 in FIG. 2) is pressed against a sub-plate (2 in FIG. 2) by a first group of springy members (11, 11' in FIG. 2);

the first group of fastening members (21, 21' in FIG. 2) penetrate through a hole provided in the block and abut against receiving part of the sub-plate (2 in FIG. 2), the receiving part of the sub-plate being in a plane perpendicular to the focus adjustment direction and parallel to the sub-scanning and main-scanning adjustment directions;

the second group of fastening members (22, 22' in FIG. 2) penetrate through a fastening hole provided in the sub-plate and abut against receiving part of the block, the receiving part of the block being in a plane perpendicular to the sub-scanning adjustment direction; and the third group of fastening member (23 in FIG. 2) penetrates through a fastening hole provided in the sub-plate (2) and abuts against receiving part of the block, the receiving part of the block being in a plane perpendicular to the main-scanning adjustment direction.

Furthermore, springy members to contact the receiving parts with the corresponding fastening members are disposed between the block and the sub-plate; and the springy members are composed of the first group of springy members (11, 11' in FIG. 2) which pull the block in directions (F1, F1' in FIG. 3) perpendicular to the CCD substrate at both ends of CCD in the longitudinal direction, and a second group of springy members (12, 12' in FIG. 2, also see FIG. 4) which are disposed between the block and the sub-plate and press the block in directions (F2, F2' in FIG. 3) orthogonal to and along (F3 in FIG. 3) the longitudinal direction of the CCD substrate within the plane of the CCD substrate at both ends of CCD in the longitudinal direction.

The preferred embodiment of this invention is in detail explained below.

Referring to FIGS. 1 and 2, in the embodiment of the invention, the CCD substrate 5 is attached to the block 1, and this block 1 is positioned by three groups of five adjusting screws (21, 21'), (22, 22') and 23.

These three groups of adjusting screws (21, 21'), (22, 22') and 23 are orthogonal to one another.

Furthermore, springs are provided to press the respective adjusting screws (21, 21'), (22, 22') and 23 against their receiving parts.

The content of adjustment in the embodiment of the invention is explained below.

In general, in image scanning unit of this kind device, the light-receiving part of CCD needs to be attached at a predetermined position at a precision of tens of microns.

Figure 5:
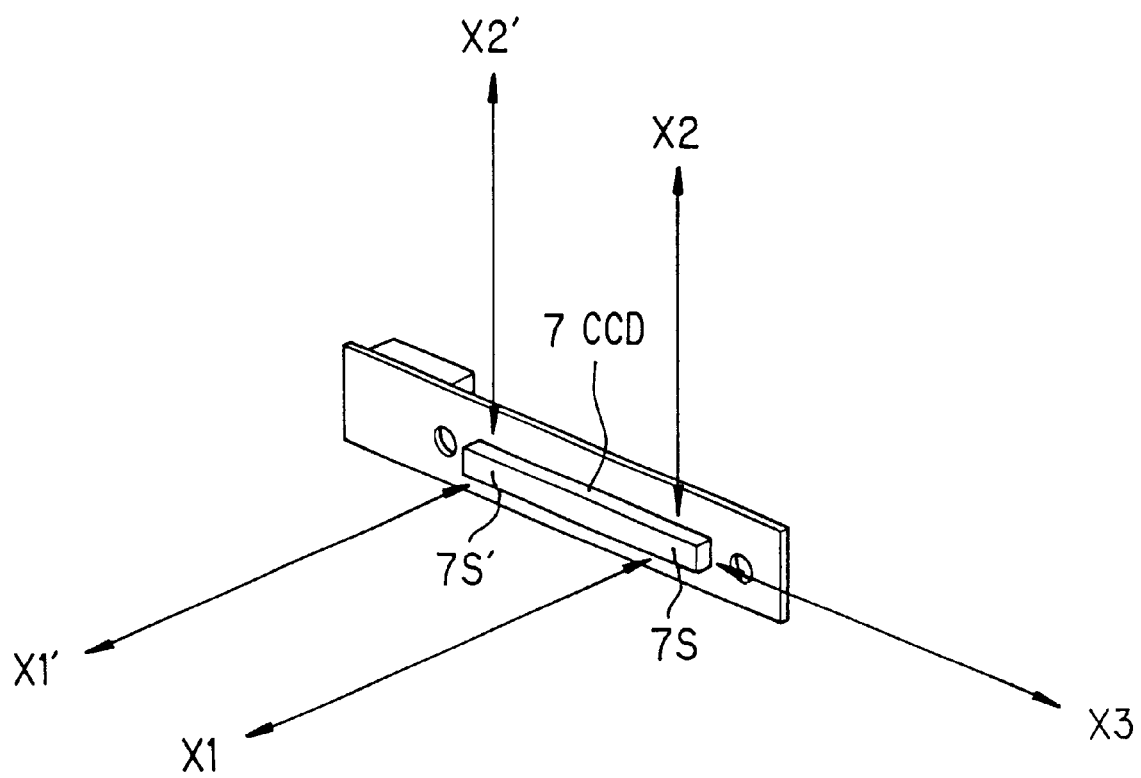
FIG. 5 is a perspective view showing the adjustment directions of a CCD substrate 5 in the embodiment.

The degrees of freedom in the adjustment are five, which is explained in FIG.5 where 7s, 7s' represent both ends of light-receiving element in CCD.

The degrees of the freedom in the adjustment are composed of: two degrees of freedom . . . (1) focus adjustment (7s and 7s' are adjusted in the X1 and X1' directions, respectively) two degrees of freedom . . . (2) sub-scanning adjustment (7s and 7s' are adjusted in the X2 and X2' directions, respectively), and one degree of freedom . . . (3) main-scanning adjustment (7s and 7s' are adjusted in the X3 direction), where these three kinds and totally five of degrees of freedom are orthogonal to one another and each of them needs a precision of tens of microns.

Meanwhile, although, in general, the degrees of freedom of a three-dimensional body are six, the remaining one degree of freedom in this embodiment corresponds to an arrow as to degree of freedom in the parallel direction of X1 at a position apart from X1, X1', i.e. rotation around X3, and this does not require especially fine positioning, therefore its adjustment is not necessary. These are explained in more detail below, referring to its specific example.

A composition in the embodiment of the invention is explained below. FIG.1 is a perspective view showing the appearance after assembling of an image scanning unit in the embodiment of the invention. In FIG.1, 1 is the block, 2 is the sub-plate, 4 is a lens and 5 is the CCD substrate. FIG.2 is a broken perspective view of the image scanning unit in FIG.1.

CCD 7 is mounted on the CCD substrate 5, with a peripheral circuit (not shown).

The CCD substrate 5 is fixed to the block 1 by locking screws 6, 6'. The block 1 is of a metal material and also functions as a radiator for CCD 7.

The block 1 is pressed against the sub-plate 2 by the coil springs 11, 11'.

The adjusting screws 21, 21' penetrate through tap holes p, p' and are in contact with receiving parts of the sub-plate 2. The receiving parts of the sub-plate 2 are in a plane perpendicular to the focus-adjusting direction. Namely, they are parallel to the sub-scanning adjustment direction and main-scanning adjustment direction.

The two adjusting screws 21, 21' are located near the extension of arrayed light-receiving elements on CCD 7, and on both sides of the light-receiving unit, while being distant, by a nearly equal distance, from the light-receiving unit.

To locate the adjusting screws 21, 21' at this position and to facilitate the adjustment, the CCD substrate 5 is provided with holes (free holes) a, a', and the adjusting screws 21, 21' penetrate through the holes a and a', respectively.

The adjusting screws 22, 22' penetrate through screw holes q, q' provided in the sub-plate 2 and are in contact with receiving parts j, j' on the block 1.

The receiving parts j, j' on the block 1 are in a plane perpendicular to the sub-scanning adjustment direction.

The adjusting screw 23 penetrates through a screw hole r in the sub-plate 2 and is in contact with receiving part k on the block 1. The receiving part k on the block 1 is in a plane perpendicular to the main-scanning adjustment direction.

The tip portion of the adjusting screws 21, 21', 22, 22' and 23 is rounded, and the surface of the screws is coated with a sticky fixing material.

Also, to the respective receiving part, a spacer of stainless steel is fixed by caulking etc. Meanwhile, the position of caulking is located apart from the part to contact the adjusting screw.

To bring always the adjusting screws into contact with the respective receiving parts, the tension springs 11, 11' and the helical springs 12, 12' are disposed between the block 1 and the sub-plate 2.

Figure 3:
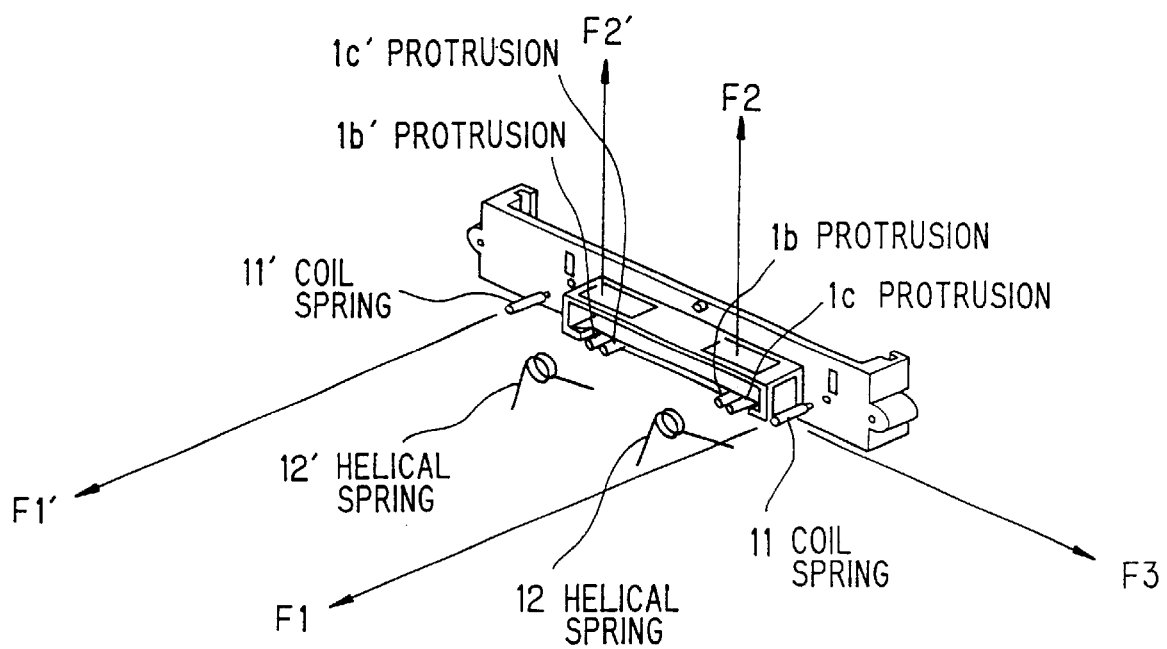
FIG. 3 is a perspective view showing directions that a block 1 is pressed by springs in the embodiment.
Figure 4:
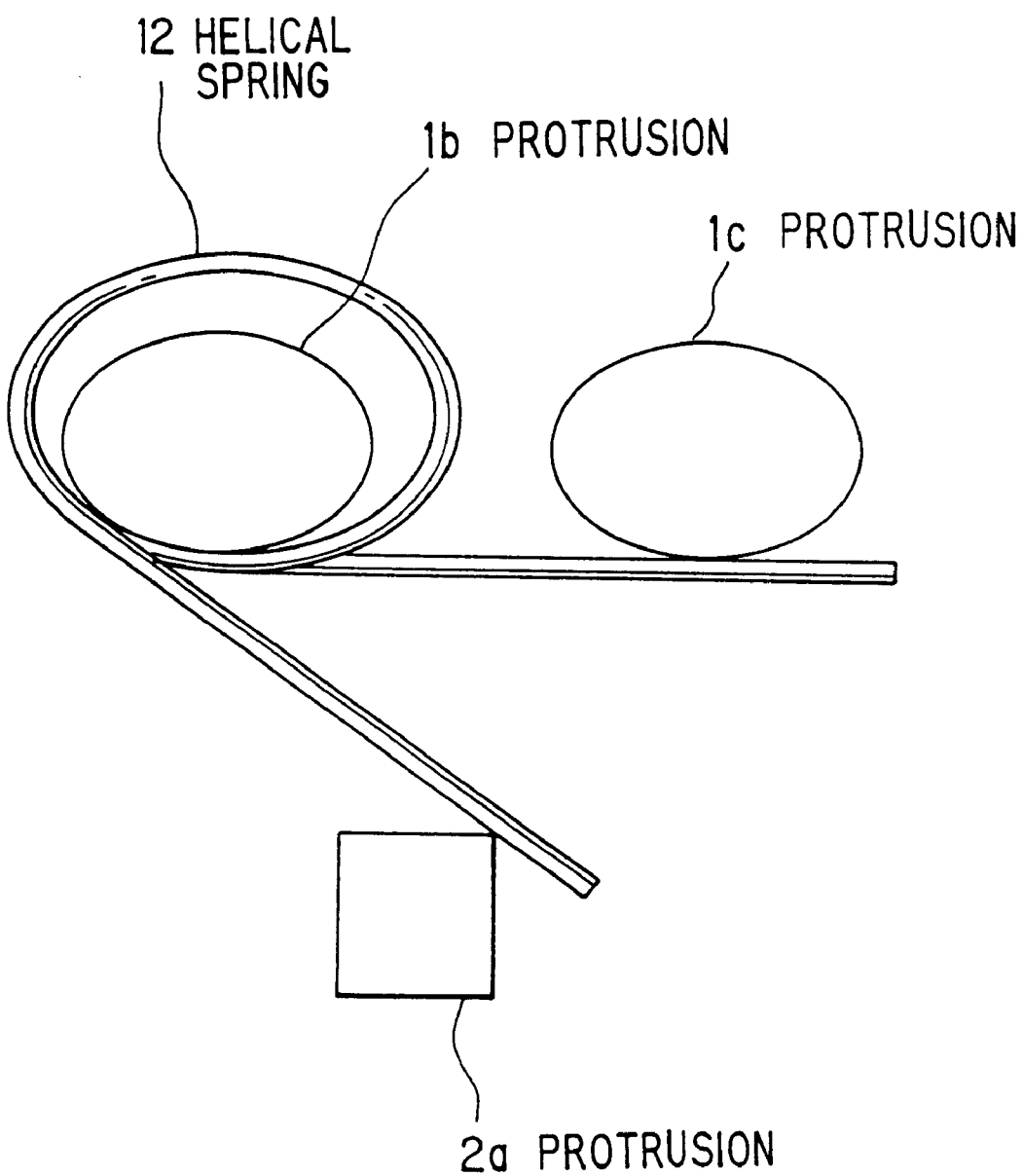
FIG. 4 is an illustration showing a method of mounting a helical spring 12 in the embodiment.

The tension springs 11, 11' pull the block 1 in the direction of F1, F1' in FIG. 3.

The helical spring 12 is engaged with protrusions 1b, 1c on the block 1 and with a protrusion 2a provided on the sub-plate 2 (see FIG. 4), and presses the block 1 in the directions of F2, F3 in FIG. 3.

The helical spring 12' is disposed like the helical spring 12, and presses the block 1 in the directions of F2', F3.

The lens 4 is fixed to the sub-plate 2 by a holder 8.

One end 8b of the holder 8 is formed key-shaped and is engaged with receiving hole b in the sub-plate 2. Also, the holder 8 is provided with a free hole c to penetrate through another end of the holder 8, and is fixed to the plate 3 by a locking screw 32 to engage with a screw hole v.

The holder 8 is of a springy material, and its dimension is set to press the lens 4 against the sub-plate 2 when screwing up the locking screw 32.

The lens 4 is located at a predetermined position by a mounting seat 2c formed in the sub-plate 2.

Meanwhile, the lens 4 has a focal distance measured in advance, and the mounting position of the sub-plate 2 to the plate 3 is set according to the focal distance of the lens 4. This setting needs only a precision of about 0.5 mm, therefore no adjusting mechanism is especially necessary.

Also, the plate 3 is provided with an opening w, through which the sub-plate 2 can be mounted on the plate 3 while holding the lens 4 on the sub-plate 2.

The mounting of the sub-plate 2 is performed by locking screws 33, 33' to penetrate through long holes d, d' in the sub-plate 2 and then screw up screw holes u, u' in the plate 3.

Since, as described earlier, the degrees of freedom in a three-dimensional body are six, the final degree of freedom is blocked by a protrusion 1a provided on the block 1 and receiving part 2b on the sub-plate 2.

The receiving part 2b is parallel to the receiving parts for the adjusting screws 21, 21', and is provided with a spacer of stainless steel, like the other receiving parts.

The operations in the embodiment of the invention are explained. Namely, since this invention relates to the manuscript scanning unit whose adjustment is made easier, the adjustment procedures are explained below.

The adjustment is conducted in the state that the entire unit is assembled as shown in FIG. 1.

In this adjustment operation, a chart disposed at a place where the manuscript is in situ located, means for projecting this chart, and means for monitoring the output of CCD are necessary. However, the explanations thereof are omitted herein since they are well-known typical means.

The adjustment operation is conducted by moving the position of the CCD substrate 5 until when a suitable output from CCD can be obtained. The determination as to whether it is the suitable output is performed by using a pattern drawn in the chart and a distribution pattern of output level of CCD. However, for the contents of pattern and the determination method, any well-known general methods can be used. Therefore, the explanations thereof are also omitted herein.

Thus, only that, in the embodiment, the CCD substrate 5 can be easily and fine positioned as to the five degrees of freedom is explained herein.

The adjustment procedures are explained below.

First, the adjusting screws 21, 21' are rotated to perform the focusing.

When the screw 21 is rotated, the screw 21 moves back and forth in the direction of the arrow X1, by p threaded in the block 1. Since the block 1 is pressed against the sub-plate 2 by the screw 11, the CCD substrate 5 moves in the direction of the arrow X1 by this screw adjustment.

Similarly, when the screw 21' is rotated, the CCD substrate 5 moves back and forth in the direction of the arrow X1'.

Then, the adjustment in the sub-scanning direction is performed by the screws 22, 22'.

When the screw 22 is rotated, the tip of the screw 22 moves back and forth in the direction of the arrow X2, by the thread formed in the sub-plate 2. Since the block 1 is pressed against the sub-plate 2 by the springs 11, 11', the adjustment in the arrow X2 (X2') can be performed by the rotation of the screw 22 (22').

Finally, by rotating the screw 23, the adjustment in the arrow X3 can be performed.

For example, when the adjustment in the arrow X3 is conducted by rotating the screw 23, the positions where the other adjusting screws are in contact with the corresponding receiving planes move as well. However, as described earlier, the receiving planes corresponding to the other adjusting screws are parallel to the direction of the arrow X3, and therefore there is no deviation in the other adjustment directions.

Although the adjustment is deviated when the flatness of the receiving planes corresponding to the other adjusting screws is low, in this embodiment, such a problem does not occur because the respective receiving plane are of stainless steel.

Also, as described earlier, the CCD substrate 5 requires a positioning precision of tens of microns. For example, when the pitch of screw is set to be 200 microns ($\mu$m), the screw adjustment only has to be performed at a precision of about one-fourth rotation. Therefore, the skill on the adjustment work is not especially required.

Meanwhile, when it is confirmed that the output of CCD is suitable, re-fixing, locking of screw etc. are not necessary thereafter. This is because, as described earlier, the respective adjusting screws are in advance coated with the sticky material, thereby preventing the deviation of the adjustment.

Other alterations in the embodiment of the invention are explained below.

The helical springs 12, 12' are removable by altering the mounting direction of the springs 11, 11'.

Although in the above-mentioned embodiment the adjustment is conducted while mounting on the plate, the plate may be mounted on the machine side and, when adjusting, the jigs may substitute for the function of the plate.

When the adjustment range in the focusing direction is too long, the slope of CCD can be corrected by providing a correction screw parallel to the screw 21 at the protrusion 1a.

Advantages of the Invention:

As described above, in this invention, the positioning adjustment can be performed independently in the focus-adjusting, sub-scanning and main-scanning directions, and the adjustment mechanism that makes the adjustment easy can be realized by providing the springy member to press the block, on which the CCD substrate is mounted, against the plate.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An image scanning unit, comprising:

a CCD substrate which is mounted on a block;

three groups of adjustment fastening members to position said CCD substrate in three dimensional directions orthogonal to one another; and a springy member to press each of said adjustment fastening members against receiving part of each of said adjustment fastening members;

wherein said three groups of adjustment fastening members are composed of a first group of fastening members to conduct the focus adjustment by independently positioning said CCD substrate in a direction perpendicular to the plane of said CCD substrate at both ends of CCD in the longitudinal direction, a second group of fastening members to conduct the sub-scanning adjustment by independently positioning said CCD substrate in a direction orthogonal to the longitudinal direction of said CCD substrate within the plane of said CCD substrate at both ends of CCD in the longitudinal direction, and a third group of fastening member to conduct the main-scanning adjustment by independently positioning said CCD substrate in a direction along the longitudinal direction of said CCD substrate within the plane of said CCD substrate.

2. An image scanning unit, according to claim 1, wherein:

said block is pressed against a sub-plate by a first group of springy members;

said first group of fastening members penetrate through a hole provided in said block and abut against receiving part of said sub-plate, said receiving part of said sub-plate being in a plane perpendicular to the focus adjustment direction and parallel to the sub-scanning and main-scanning adjustment directions;

said second group of fastening members penetrate through a fastening hole provided in said sub-plate and abut against receiving part of said block, said receiving part of said block being in a plane perpendicular to the sub-scanning adjustment direction; and said third group of fastening member penetrates through a fastening hole provided in said sub-plate and abuts against receiving part of said block, said receiving part of said block being in a plane perpendicular to the main-scanning adjustment direction.

3. An image scanning unit, according to claim 2, wherein:

said first to third groups of fastening members are a screw whose tip is rounded and on the surface of which a sticky fixing material is coated.

4. An image scanning unit, according to claim 2, wherein:

said receiving part is provided with a spacer of corrosion resisting metal material.

5. An image scanning unit, according to claim 2, wherein:

springy members to contact said receiving parts with said corresponding fastening members are disposed between said block and said sub-plate; and said springy members are composed of said first group of springy members which pull said block in a direction perpendicular to said CCD substrate at both ends of CCD in the longitudinal direction, and a second group of springy members which are disposed between said block and said sub-plate and press said block in directions orthogonal to and along the longitudinal direction of said CCD substrate within the plane of said CCD substrate at both ends of CCD in the longitudinal direction.

6. An image scanning unit, according to claim 2, wherein:

said CCD is one dimensional CCD.

* * * * *